United States Patent [19]

Schmidt et al.

[11] 4,173,192

[45] Nov. 6, 1979

[54] ELECTROHYDRAULIC NEEDLE BAR POSITIONING APPARATUS FOR TUFTING MACHINES

[75] Inventors: Henry A. Schmidt, Elma, N.Y.; Larry P. Gable, Dalton, Ga.; Wallace W. Hammel, Jr., East Ridge, Tenn.

[73] Assignee: Tuftco Corp., Chattanooga, Tenn.

[21] Appl. No.: 845,826

[22] Filed: Oct. 26, 1977

[51] Int. Cl.² .................................. D05C 15/30
[52] U.S. Cl. ........................ 112/79 R; 112/79 A
[58] Field of Search ............. 112/79 R, 79 A, 79 FF, 112/78, 121.12, 221, 84, 86, 102, 275

[56] References Cited

U.S. PATENT DOCUMENTS

| | | | |
|---|---|---|---|
| 3,157,261 | 11/1964 | Bono | 112/275 |
| 3,247,815 | 4/1966 | Polevitzky | 112/79 R |
| 3,266,488 | 8/1966 | Haggar | 112/84 |
| 3,934,524 | 1/1976 | Smith | 112/79 A |
| 3,982,491 | 9/1976 | Herzer et al. | 112/121.12 |
| 4,089,281 | 5/1978 | Landoni | 112/221 |

*Primary Examiner*—H. Hampton Hunter
*Attorney, Agent, or Firm*—Harrington A. Lackey

[57] ABSTRACT

A hydraulic actuator for transversely shifting the relative positions of a needle bar and the backing material in a tufting machine. An electronic pattern control mechanism drives the hydraulic actuator in response to the predetermined stitch pattern information in the electronic control circuit, which determines the amount of relative transverse shifting of the needle bar for each stitch location. A feedback mechanism associated with the hydraulic actuator creates a feedback signal which is compared with a pattern stitch command signal in order to produce an output signal for shifting the hydraulic actuator to a subsequent transverse needle bar position relative to the preceding needle bar position.

14 Claims, 8 Drawing Figures

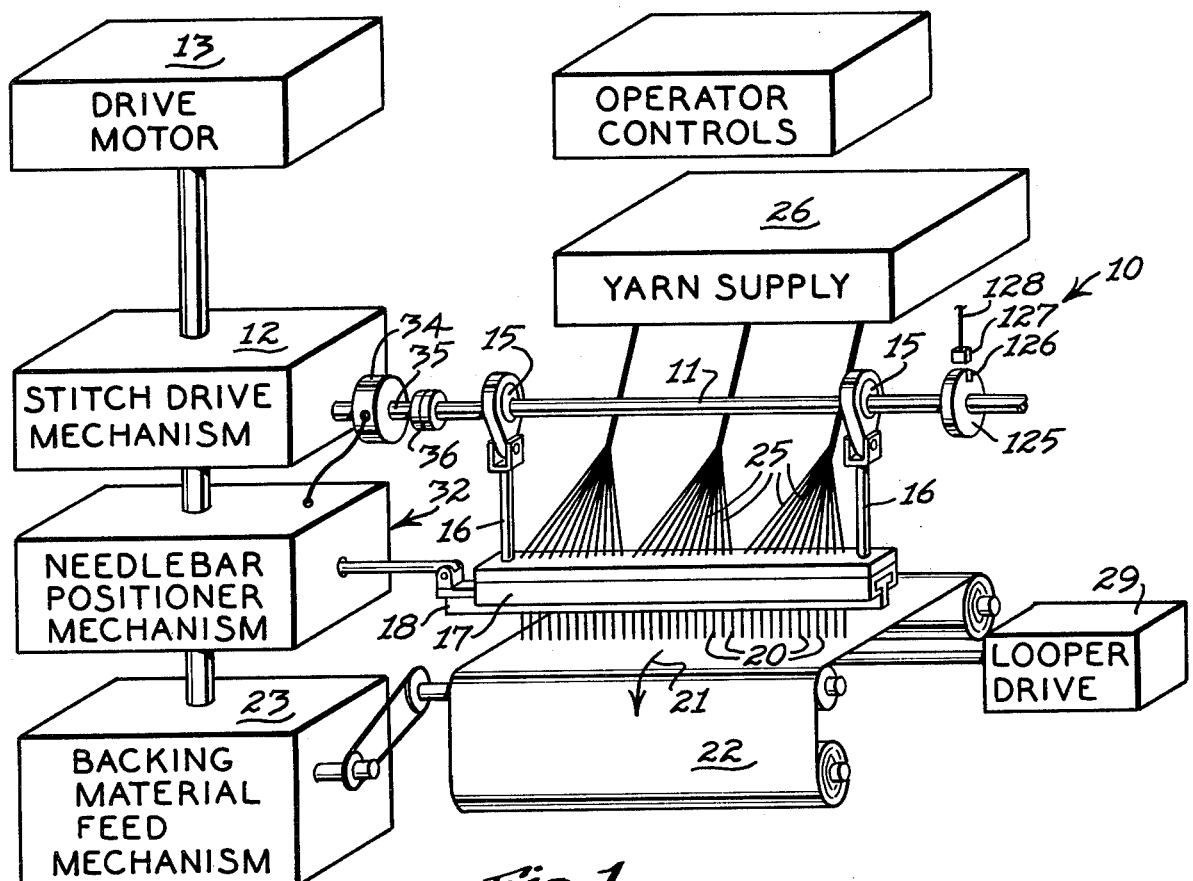
Fig. 1
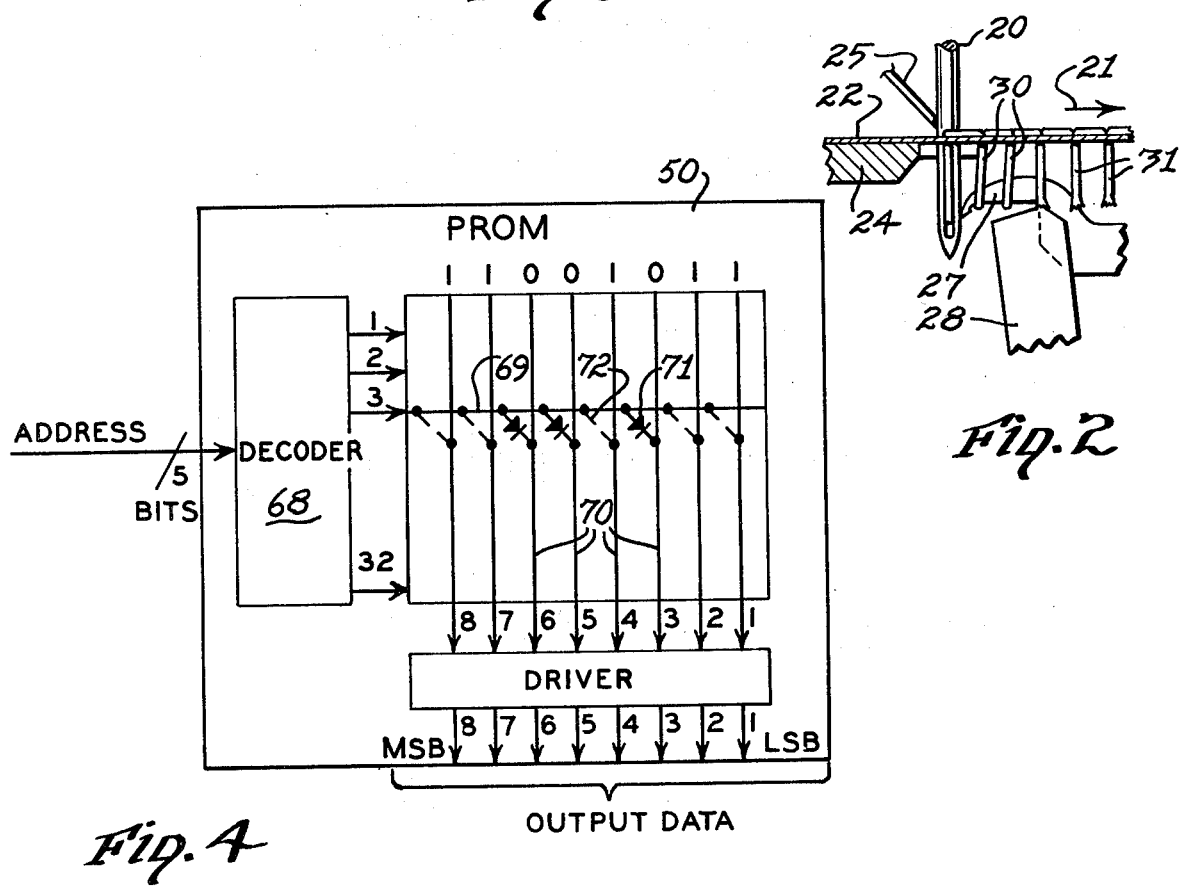
Fig. 2
Fig. 4

| BINARY CODE 6 LEAST BITS OF THE 8 | MULTIPLE NUMBER | POSITION COMMANDED |
|---|---|---|
| 000000 | 1 | 0.0 CM. |
| 000001 | 2 | 1.5875 MM. |
| 000010 | 3 | 2.38125 MM. |
| 000011 | 4 | 3.175 MM. |
| — | — | — |
| — | — | — |
| 111100 | 61 | 48.41875 MM. |
| 111101 | 62 | 49.2125 MM. |
| 111110 | 63 | 50.00625 MM. |
| 111111 | 64 | 50.8 MM. |

ELECTROHYDRAULIC NEEDLE BAR POSITIONING APPARATUS FOR TUFTING MACHINES

BACKGROUND OF THE INVENTION

This invention relates to a needle positioning apparatus for a multiple-needle tufting machine, and more particularly to an electrohydraulic needle bar positioning apparatus for a multiple-needle tufting machine.

Heretofore in the production of tufted fabrics, distinctive patterns, such as various zig-zag patterns have been formed in backing fabrics by transversely or laterally shifting the needle bar, or by shifting the backing material support beneath the needles, needle-gauge increments for each stitch, in accordance with a predetermined pattern.

The predominant, if not sole, means for executing this lateral or transverse shifting of the needle bar, or the backing material support, is a pattern cam continuously rotated in synchronism with the rotary drive of the tufting machine, in which the pattern cam engages a cam follower connected to a laterally reciprocably movable needle bar, or a laterally reciprocably movable backing material support. Examples of such pattern cam control mechanisms for laterally shiftable needle bars or fabric supports are disclosed in numerous prior U.S. patents, such as the following:

| | | |
|---|---|---|
| 2,513,261 | Behrens | June 27, 1950 |
| 2,679,218 | Jones | May 25, 1954 |
| 2,682,841 | McCutchen | July 6, 1954 |
| 2,855,879 | Manning et al | Oct. 14, 1958 |
| 3,026,830 | Bryant et al | Mar. 27, 1962 |
| 3,100,465 | Broaderick | Aug. 13, 1963 |
| 3,109,395 | Batty et al | Nov. 5, 1963 |
| 3,396,687 | Nowicki | Aug. 13, 1968 |

There are numerous disadvantages in the use of pattern cams for controlling the lateral or transverse shifting of needle bars or fabric supports.

Since the pattern cam control mechanism is entirely mechanical, there is considerable wear on both the cam surfaces and the cam rollers or followers.

There is a long change-over period for the pattern cams, when patterns of different designs are required.

Machine speed is limited by, not only the mechanical arrangement, but also the abrupt changes in the pattern cam surfaces.

There is extremely high machine stress caused by having to accelerate the lateral movement of the needle bar to near infinity because of the sharp cam lobes.

Where there are machining inaccuracies in the profile of the cams, differing lateral or transverse relationships between the hooks and needles may be produced for different pattern positions.

The continuous operation of the pattern cams and cam followers produces an excessive noise level.

SUMMARY OF THE INVENTION

It is therefore an object of this invention to overcome the disadvantages of the pattern cam controlled positioning apparatus for a tufting machine, by providing an electrohydraulic positioning apparatus for a tufting machine capable of transversely or laterally shifting the needle bar or the backing fabric support in accordance with a predetermined pattern.

The electrohydraulic positioning apparatus includes a hydraulic actuator coupled to the needle bar or the backing fabric support. The hydraulic actuator is controlled by an electronic control circuit including an interchangeable, plug-in, stitch pattern integrated circuit referred to as PROM (Programmable Read Only Memory), in which the particular stitch pattern information is stored in inalterable form and in binary terms. The stitch pattern positions are accessed by a digital electronic counter in time with the stitching cycle. The output signal from the stitch pattern circuit is transmitted to a digital analog converter which generates a position command signal.

Operatively associated with the hydraulic actuator is a feedback transducer, which produces a feedback signal corresponding to the actual position of the actuator, or needle bar. The feedback signal is compared with the command signal, and the resulting output electrical signal drives an electrically controlled hydraulic valve causing the hydraulic actuator to move the needle bar to its new transverse position corresponding to the stitch pattern.

Preferably, the positioning apparatus is also provided with an interlock circuit, including a sensor for generating a signal when the needle bar is in its uppermost position. The generating signal then actuates the motor starter for the hydraulic power supply. Thus, the positioning apparatus cannot be started automatically, unless the needles are in their uppermost position. The interlock circuit thus prevents abrupt or fast starts of the positioning apparatus while the needles are down penetrating the backing fabric. In this manner, tearing of the fabric and damage to the needles are prevented.

The electrohydraulic needle bar positioning apparatus made in accordance with this invention has practically no wearing parts, and is therefore capable of substantially longer life and longer continual operational time than the prior art pattern cam-controlled positioning devices.

The stitch pattern integrated circuits are formed on plug-in, printed circuit boards of uniform size and shapes, and therefore can be easily and quickly interchanged, generally within a period of fifteen seconds, as opposed to the long down-times for interchanging pattern cams in a cam-controlled needle positioning apparatus.

The electrohydraulic needle bar positioning apparatus, made in accordance with this invention, provides accurate needle position information without the necessity of accurate machining of mechanical parts.

Repeat patterns can be formed with a substantially greater number of stitches than with the prior art pattern control cams.

The needle positions provided by this electroyhdraulic positioning apparatus are so accurate that no hook adjustments are necessary.

This positioning apparatus is a "closed loop system", which provides constant feedback information designating the exact position of the needles at all times, as opposed to the pattern control cam positioning apparatus without any feedback system at all.

Greater operating speeds of the tufting machine at low noise levels are possible with the positioning apparatus made in accordance with this invention.

BRIEF DESCRIPTION OF THE DRAWINGS

FIG. 1 is a front perspective schematic view of a multiple-needle tufting machine incorporating the electrohydraulic needle bar positioning apparatus of this invention;

FIG. 2 is an enlarged, fragmentary sectional elevation of a needle and looper forming cut pile stitching in the base fabric of FIG. 1;

FIG. 4 is a schematic view of the stitch pattern integrated circuit;

DESCRIPTION OF THE PREFERRED EMBODIMENTS

Figure 3:
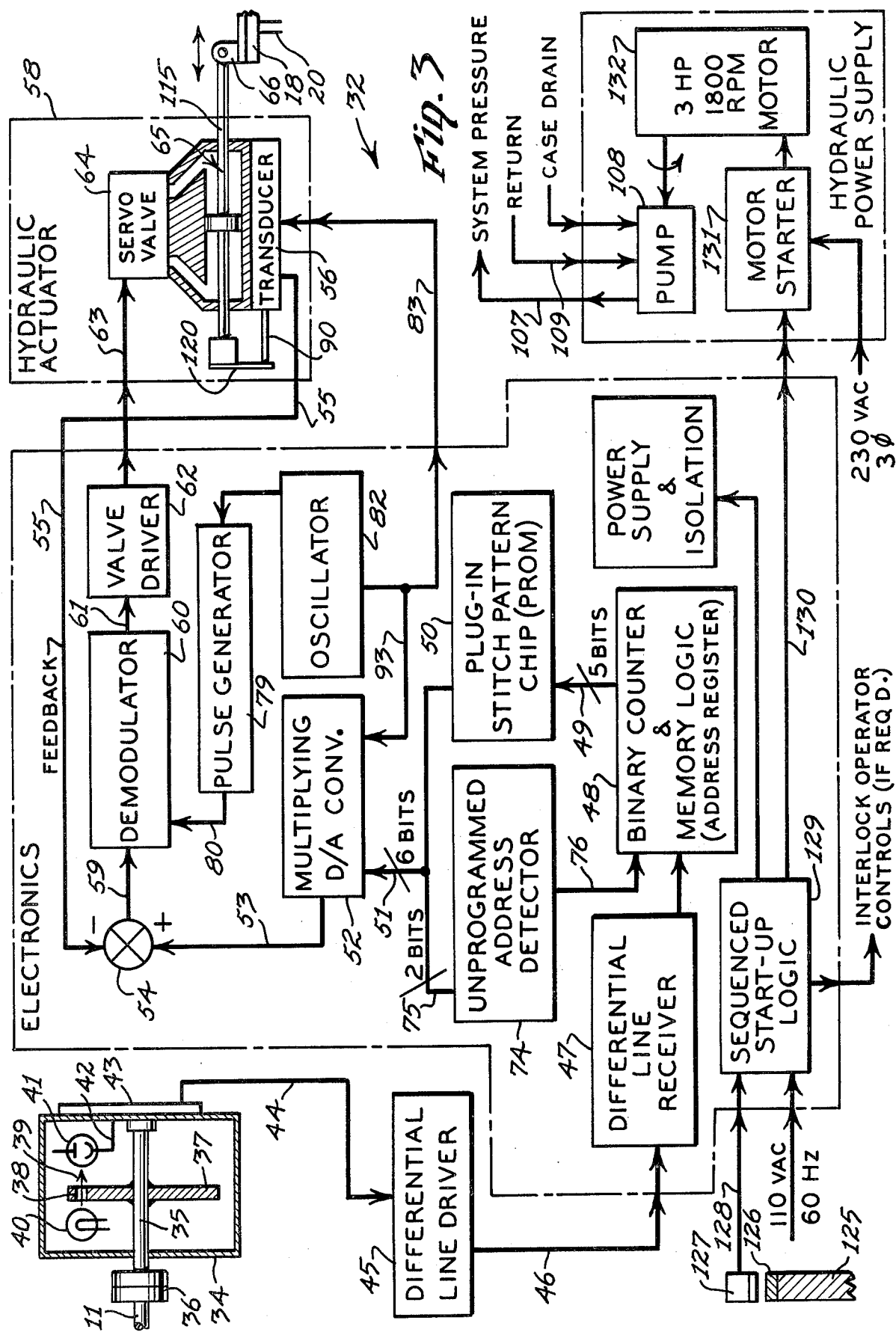
FIG. 3 is an electrical block diagram of the needle bar positioning apparatus of FIG. 1.

Since multiple-needle tufting machines are so well-known in the art, only the basic elements of a typical multiple-needle tufting machine have been disclosed schematically in FIG. 1.

The tufting machine 10 disclosed in FIG. 1 includes a rotary needle shaft or main shaft 11 driven by a stitch drive mechanism 12 from a drive motor 13. Rotary eccentric mechanisms 15 mounted upon the rotary needle shaft 11 are adapted to reciprocably move the vertical push rods 16 for vertically and reciprocably moving the needle bar slide holder 17 and the needle bar 18. The needle bar 18 supports a plurality of uniformly spaced tufting needle 20 in a longitudinal row, or staggered longitudinal rows, extending transversely of the feeding direction 21 of the backing fabric 22.

The backing fabric 22 is moved longitudinally through the tufting machine 10 by the backing material feed mechanism 23 and across a backing material support, including the needle plate 24 (FIG. 2).

Yarns 25 are fed from the yarn supply 26 to the respective needles 20. As each needle 20 carries a yarn 25 through the backing material 22, a hook 27 is reciprocably driven by the looper drive 29 to cross each corresponding needle 20 and hold the corresponding yarn to form the loops 30 (FIG. 2). The cut pile tufts 31 are formed by cutting the loops 30 with the knife 28.

Of course, by eliminating the knives 28 and by reversing the direction of, and substituting, loop hooks, uncut loops 30 may formed instead of the cut pile tufts 31, as disclosed in FIG. 2, in a well-known manner.

The needle bar positioning apparatus 32 is designed to laterally or transversely shift the needle bar 18 relative to the needle bar holder 17 a predetermined transverse distance equal to the needle gauge, or a multiple of the needle gauge, and in either transverse direction from its normal central position, relative to the backing fabric 22, and for each stitch of the needles 20.

In order to generate an input signal corresponding to each stitch of the needles 20, an encoder 34 is mounted upon a stub shaft 35, which is operatively connected by coupling 36 to the main shaft or needle shaft 11, so that the stub shaft 35 will have the same RPM's as the needle shaft 11. Since the needle shaft 11 makes one revolution per stitch, the stub shaft 35 will also make one revolution per stitch.

In order to give the needle bar 18 and the positioning apparatus 32 the maximum amount of time for shifting the needle bar 18 to its next transverse position, the input signal is preferably generated immediately after the ascending needles 20 just clear the backing fabric 22 so that the shifting operation is completed before the needles 22 begin their next penetration of the backing fabric 22.

In a preferred form of the invention, the encoder 34 (FIG. 3) includes a shutter disc 37 fixed upon the stub shaft 35 with a light aperture 38 formed in the periphery of the disc 37 to permit the passage of a light beam 39 from the lamp 40 to the photoelectricl cell 41, when the aperture 38 is in registry, or in axial alignment, with the lamp 40 and the photocell 41. The lamp 40 and photocell 41 are, of course, properly positioned for registry with the light aperture 38 at the instant that the ascending needles 20 clear the backing fabric 22. The light ray 39 is converted by the photocell 41 into the electrical input signal which is transmitted by the lead 42 into the integrated circuit 43. The electrical input signal is then transmitted through the input line 44, differential line driver circuit 45, lead 46, and differential line receiver 47 into the binary counter and memory logic circuit of the address register 48. The circuits of the differential line driver 45 and differential line receiver 47 are conventional, and merely employed to minimize the noise in the input signal when it enters the address register 48.

The counter and memory logic circuit of the address register record the occurrence of the input signal or pulse and cause the counter or address register to advance one place. The circuitry of the address register contains location data for the PROM or plug-in, stitch pattern chip or circuit 50, and increments the five-bit address transmitted to the stitch pattern chip 50 through line 49.

The pattern stitch data for a particular line of stitching is then transmitted from the stitch pattern chip 50 through lead 51 to a multiplying digital/analog converter 52. The binary position output data is then converted by the digital analog converter 52 into an analog signal in the form of an alternating current, position command signal of a particular magnitude and polarity. The A.C. command signal is then transmitted through lead 53 to the summing junction 54 of the servo loop where the position command signal is compared with a feedback signal from the feedback line 55 from the feedback position transducer 56 of the hydraulic actuator 58.

The resultant error signal from the summing junction 54 is transmitted through the lead 59 to the demodulator circuit 60. The error signal, containing information, is converted to a D.C. signal varying with time in the demodulator 60. The D.C. signal is transmitted through the lead 61 to the valve driver circuit 62, to produce an amplified electrical output signal for energizing servovalve 64 through output lead 63. The servovalve 64 is energized to open the flow of hydraulic fluid to the hydraulic actuator motor 65 in an amount and direction proportional to the magnitude and polarity of the output electrical signal transmitted through the output line 63. The hydraulic actuator motor 65, being connected through coupling 66 to the needle bar 18, drives the needle bar 18 through a transverse distance and direction commensurate with the distance and direction of movement of the motor 65.

As the actuator motor 65, in this particular instance a reciprocable linear piston rod 115 and piston 114, moves, its position is constantly monitored by a linear variable differential transducer (LVDT) 56. The transducer 56 continually transmits back through the feedback line 55, an electrical feedback signal commensurate with the position and direction of movement of the actuator motor 65. When the feedback signal and the command signal, transmitted through the lead 53, produce a zero error signal in the line 59, then the actuator motor 65 and the needle bar 18 will stop in the precise position dictated by the information in the stitch pattern chip 50, accurately, and without overrun or "hunting".

Upon the next complete revolution of the needle shaft 11, and therefore upon the next stitch of the needles 20, a new input signal will be generated by the encoder 34 and processed through the electronic circuit of the positioning apparatus 32 to energize the hydraulic actuator 58 for moving the needle bar 18 to its next programmed position.

With particular reference to FIG. 4, the stitch pattern chip 50 is adapted to receive five bits of address data in binary form from the address register 48. This address data is decoded in the decoder circuit 68 to produce an output signal which will energize one of the programmed pattern stitch lines 69, such as the third line illustrated in FIG. 4. Each pattern stitch line 69 is connected to one or more of the eight output lines 70 by a diode 71, and is disconnected from the other of the eight output lines by the removal of a diode 71 to provide breaks or open circuits 72. If an output line 70, such as No. 3, is energized through the diode 71 from the pattern stitch line 69 (No. 4) the corresponding output data signal is a Logic "0". An output line 70, such as output line No. 1, disconnected from the pattern stitch line 69 (No. 3) by a break 72, will produce a Logic "1" output data signal. As disclosed in FIG. 4, the particular pattern data of the third pattern stitch line 69 will produce the binary output signals 11001011 for the eight output lines 70, respectively. These binary output signals are processed by the driver circuit 74 to produce the resultant output binary position data transmitted from the stitch pattern chip 50.

In order for the address register 48 to energize the third pattern stitch line 69 the third consecutive signal from the encoder 34 is transmitted to the address register 48 to produce a binary 3 (00011) signal. This binary signal 3 is transmitted to the decoder 68, where the binary signal is decoded to energize the third pattern stitch line.

The open circuit breaks 72 are provided by fusing or burning out corresponding diodes, such as 71.

Figures 5, 6:
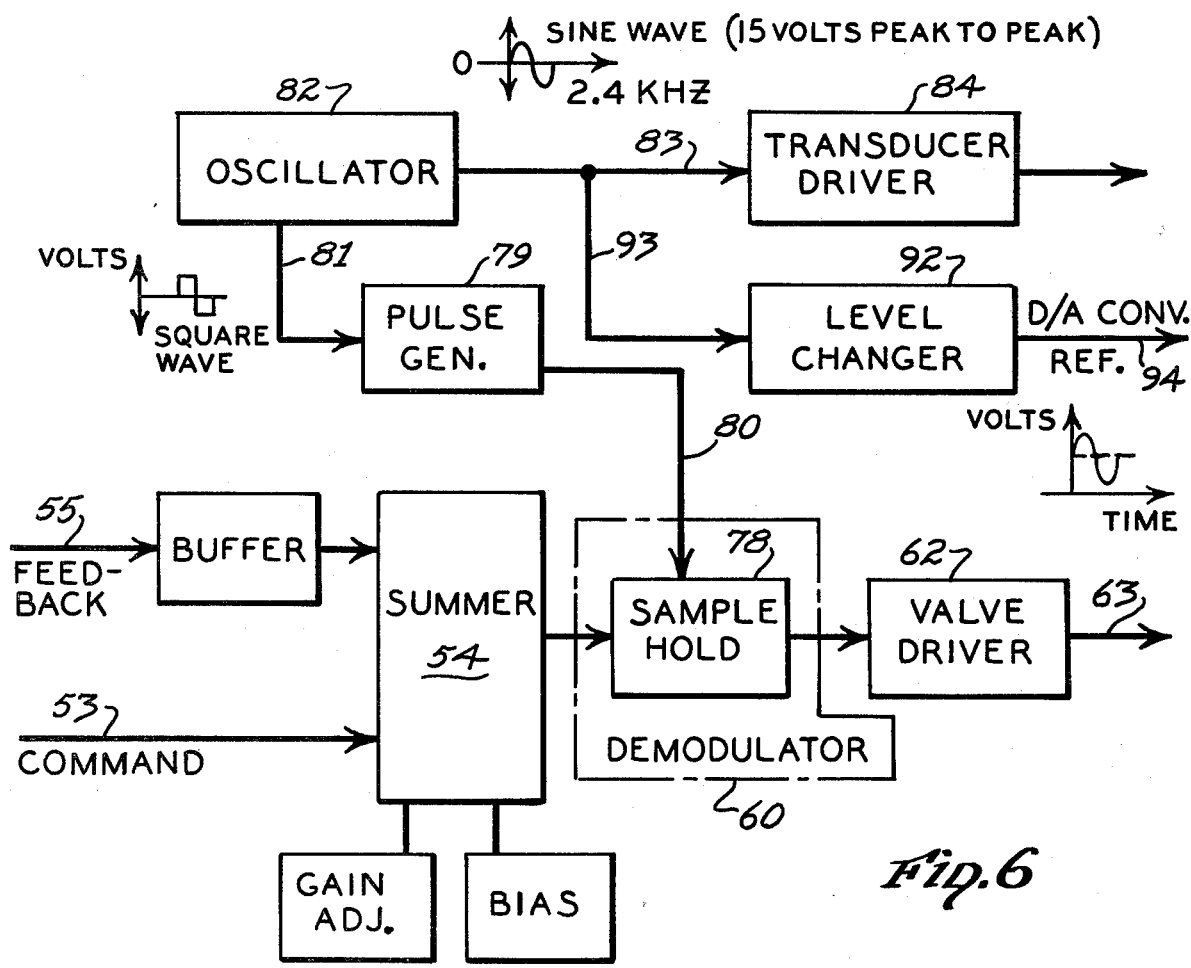
FIG. 5 is a table illustrating the binary codes corresponding to various transverse needle bar positions.
FIG. 6 is an electrical block diagram of the demodulator and associated circuits.

The output pattern stitch data from the first six output lines of the pattern stitch chip 50 are transmitted as six bits of binary information to the digital analog converter 52, while the output data from the remaining output lines 7 and 8, transmit the two most significant bits (MSB) of binary output data from the stitch pattern chip 50 back to the address register 48. The six output data lines 70 are capable of producing sixty-four different binary codes. Thus, for a maximum transverse shift of approximately two inches, 50.8 millimeters, it is possible to shift the needle bar 18 through sixty-four different increments of 0.79375 millimeters each. FIG. 5 discloses a six-bit binary code for the 64 needle bar positions having a uniform increment of 0.79375 millimeters.

The two most significant bits (MSB) from the output data lines of the stitch pattern chip 50 are transmitted to an unprogrammed address detector circuit 74 (FIG. 3) through lead 75. If the address detector circuit 74 receives Logic "0's" from output lines 7 and 8 of the stitch pattern chip 50, then it sends a signal through line 75 back to the address register 48 to return the counting circuit to its original position, or zero, and to recycle the stitch pattern program.

As illustrated in the stitch pattern chip 50 of FIG. 4, five bits of binary address data transmitted to decoder 68 permit programming of up to 32 stitch lengths for a pattern cycle or "repeat". In the preferred form of the invention, 9 binary bits are fed into the decoder 68 to permit up to 512 stitch lengths for each pattern cycle or "repeat".

The electric circuitry for the address register, and the decoder, driver and other integrated circuits of the stitch pattern chip, not shown in FIG. 4, as well as the circuitry for the unprogrammed address detector 74, are within the ordinary skill of the art.

The multiplying digital analog converter circuit 52 is also within the skill of electronic art for converting the binary six-bit position data into an elecrrical A.C. position command for analog signals. One example of such a digital analog converter actually employed in the electronic circuitry for this position apparatus 32 is the Integrated Circuit D/A converter-AD562 of Labtronics, Inc. of Syracuse, N.Y.

As illustrated in FIG. 6, the demodulator 60 includes a sample hold circuit 78 which is timed with square wave pulses from a pulse generator 79 through lead 80. The input lead 81 of the pulse generator 79 is connected to an oscillator 82 which produces a sine wave 90° out-of-phase with the square wave produced by the pulse generator 79. The sample hold circuit 78 samples on every negative-going edge of the square wave output of the pulse generator 79 to transmit to the valve driver circuit 62 demodulated information in the form of a D.C. signal varying with time, corresponding in magnitude and polarity to the sum of the pattern information in the stitch pattern chip 50 and the modulated information from the transducer 56. The sample hold circuit 78 design is within the ordinary skill of one versed in electronics, and functions to read the modulated error information, and hold the information signal until the next sequenced sample is taken. The valve driver 62 amplifies the output D.C. signal to the proper value for energizing the servovalve 64.

Figure 8:
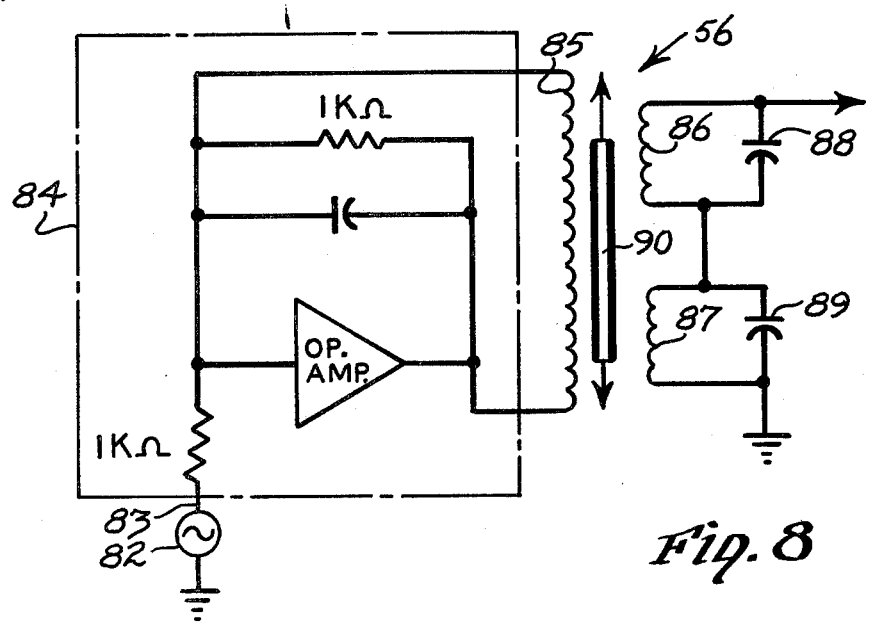
FIG. 8 is a schematic electrical diagram of the feedback transducer.

The oscillator 82 also transmits its A.C. signal through line 83 to a transducer driver 84 (FIG. 6) for energizing the primary coil 85 and the balanced secondary coils 86 and 87 of the transducer 84 (FIG. 8). Each secondary coil 86 and 87 is connected in parallel with the respective nulling capacitors 88 and 89. Between the coils 85 and 86-87 is a longitudinally reciprocal iron core or rod 90, the longitudinal movement of which is capable of modulating the feedback signal transmitted back through the line 55 to the summing junction 54.

The oscillator 82 also transmits its A.C. signal to the level changer 92 through lead 93 to provide a reference voltage signal for the digital analog converter 52 through lead 94.

The servovalve 64 (FIG. 7) includes an electromagnetic torque motor 96 having a pair of opposed coils 97 around the armature 98 disposed between the upper pole piece 99 and the lower pole piece 100 of an electromagnet. The armature 98 is fixed to a flapper member 101 adapted to control the hydraulic fluid flow through nozzles 102A and 102B from opposite passages 103 and 104 in valve housing 110. The fluid passages 103 and 104 are in communication with inlet orifices 105 and 106 through which hydraulic fluid under pressure flows from inlet conduit or port 107 and pump 108. Hydraulic fluid is discharged through return conduit 109 from the valve housing 110 to the pump 108.

The magnitude and polarity of the output signal received by the electromagnetic coils 97, determines the quantity and direction of the hydraulic fluid flowing through the respective piston conduits 111 and 112 to the piston chamber 113 on opposite sides of the piston 114. In the particular embodiment of the hydraulic actuator 58, the motor 65 consists of an elongated straight piston rod 115 driven by the hydraulic fluid in the chamber 113 against either one face of the piston 114 or the other.

Figure 7:
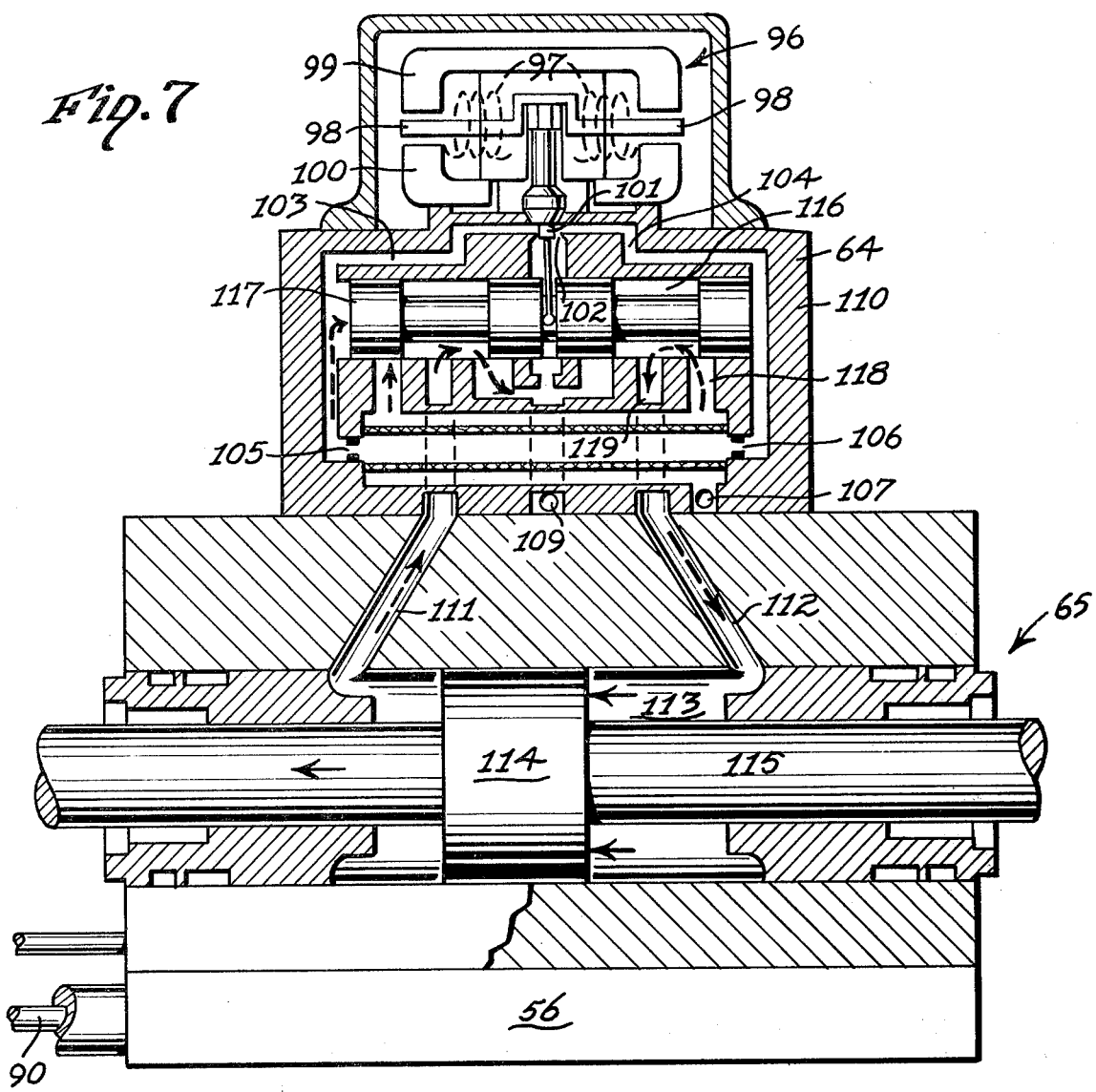
FIG. 7 is an enlarged, sectional elevation of the actuator, including the servovalve, hydraulic motor, and the feedback transducer.

As disclosed in FIG. 7, the electromagnetic coils 97 have been energized to depress the armature 98, thereby forcing the flapper member 101 to the left, to constrict the opening in the left nozzle 102A and to enlarge the opening in the right nozzle 102B. Accordingly, hydraulic fluid is free to flow through the inlet 106, passage 104, nozzle 102B, and down through the return conduit 109.

On the other hand, the constricted opening on the left nozzle 102A builds up hydraulic pressure in the line 103, which is exerted against the left end of the spool valve 117, thereby moving the spool valve toward the right. In the right position of the spool valve 117, the piston conduit 111 is opened through the chamber 116A to the return port 109, thereby relieving pressure on the left face of the piston 114. On the other hand, pressurized hydraulic fluid from the inlet 107 is permitted to enter the spool chamber 116B through passage 118 and thence into the passage 119 communicating with the piston conduit 112, whereby hydraulic fluid under pressure is forced into the chamber 113 against the right face of the piston 114, to cause the piston rod 115 to move toward the left, as indicated by the arrow (FIG. 7).

As disclosed in FIGS. 3 and 7, one end of the piston rod 115 is connected by a link bar 120 to the linear core bar 90 of the transducer 56. The simultaneous linear movement in magnitude and direction of the core bar 90 with the piston bar 115 produces a corresponding differential voltage in magnitude and direction between the secondary coils 86 and 87 in order to produce a feedback signal transmitted through the line 55 to the summing junction 54. Thus, when the feedback signal is equal and opposite in polarity to the command signal transmitted through the lead 53, a zero error signal will be generated in the line 59, which will cause the armature 98 of the torque motor 96 to return to its neutral position, thereby holding the piston rod 115 stationary in its new adjusted linear position.

Although the shifting of the position of the piston rod 115 is swift, nevertheless its movement accelerates to a peak and then gradually decelerates to its final position to provide a smooth transition for the needle bar 18 between its previous and its next programmed positions.

The velocity of the linear piston rod 115 depends upon the magnitude of the current of electrical output signal received by the coils 97 of the torque motor 96. Of course, when an electrical signal of opposite polarity is received by the torque motor 96, the armature 98 pivots in the opposite direction to reverse the flow of hydraulic fluid through the conduits 111 and 112, in order to force the piston 114 and and piston rod 115 toward the right.

In a preferred form of the positioning apparatus 32, an interlocking circuit is provided in order to prevent the hydraulic actuator 58 from moving until the needles 20 are above the backing fabric 22, and preferably at the top of their stroke. If the actuator 58 were started or operating while the needles 20 were penetrating the backing fabric 22, the backing fabric 22 and/or the needles 20 would be damaged.

As best disclosed in FIGS. 1 and 3, a flywheel 125, having a metallic or magnetic detector element 126 formed on the periphery thereof, is fixed upon the needle shaft 11 for rotation therewith. The detector element 126 is located on the top of the flywheel 125 when the needle bar 118 is in its uppermost position. Furthermore, the magnetic sensing element or head 127 is also located above and proximately adjacent the flywheel 125, so that when the needle bar 18 is in its uppermost position, the detector element 126 will be sensed by the sensing head 127 to produce an electrical signal, which is transmitted through the input lead 128 to the sequenced startup logic circuit 129. The output signal from the start-up logic circuit 129 is transmitted through lead 130 to enable the motor starter 131 to start the pump motor 132, for driving the pump 108. When the flywheel 125 is in any other angular position, then the motor starter 131 will remain disabled. The needle bar 18 may be moved to its uppermost position, to permit enabling of the pump motor starter 131, by pulsing or jogging a conventional manual starting switch connected to the drive motor 13 for interrupted energization of the stitch driving mechanism 12.

What is claimed is:

1. In a tufting machine having a backing material support, means for feeding backing material longitudinally through the machine, a needle bar supporting a plurality of needles transversely of said machine, yarn supply means for feeding yarns to said needles, and means for reciprocating said needle bar to drive said needles into and out of the backing material upon the backing material support, a positioning apparatus for shifting transversely the needle positions relative to the backing material, comprising:
    (a) a reciprocably movable, hydraulically driven actuator,
    (b) coupling means connected to said actuator for changing the relative transverse positions of said needle bar and said backing material support in response to the relative position of said actuator,
    (c) pressurized hydraulic fluid supply means for said actuator,
    (d) valve means for controlling the flow of hydraulic fluid to said actuator,
    (e) electronic pattern control means having input means and output means,
    (f) said pattern control means comprising electronically programmed information corresponding to a stitch pattern predetermining the relative transverse positions of said needle bar and said backing material support for each longitudinal needle stitch position,
    (g) stitch sensor means communicating with said input means for producing an input signal for each needle stitch,
    (h) said pattern control means also comprising means for producing programmed electrical output signals commensurate with said programmed information at said output means,
    (i) said pattern control means further comprising electrical feedback means responsive to the actual position of said actuator producing corresponding feedback signals so that each of said output signals is conditioned by a corresponding feedback signal from said feedback means, and (j) electrical valve control means responsive to the programmed electrical output signals from said output means for actuating said valve means to cause said actuator to move to a position corresponding to the value of each of said output signals.

2. The invention according to claim 1 in which said pattern control means comprises a programmed binary stitch pattern circuit, a binary counter circuit in said input means operatively communicating with said stitch pattern circuit, whereby each input signal from said stitch sensor means actuates an individual stitch pattern circuit for a predetermined transverse stitch line, a digital analog converter circuit communicating with said stitch pattern circuit for conversion of the binary output data from said stitch pattern circuit to an electrical analog command signal of corresponding value, means for comparing said command signal and said feedback signal to produce a resultant error signal, and means for transmitting said error signal to said output means.

3. The invention according to claim 2 in which said output means comprises demodulator circuit means adapted to convert said error signal to a D.C. output signal for actuating said valve means.

4. The invention according to claim 2 in which said stitch pattern circuit further comprises binary detector circuit means for re-setting said binary counter circuit at the end of a predetermined number of needle stitches.

5. The invention according to claim 1 in which the means for reciprocating said needle bar comprises a rotary needle shaft, said stitch sensor means comprising means for generating an electrical input signal for each revolution of said needle shaft.

6. The invention accoridng to claim 5 in which said stitch sensor means comprises photoelectric means for sensing each revolution of said shaft.

7. The invention according to claim 1 in which said actuator comprises a linearly movable rod and a hydraulically driven piston for moving said rod.

8. The invention according to claim 7 in which said valve means comprises spool valve means for controlling the flow of hydraulic fluid to the opposite sides of said piston.

9. The invention according to claim 8 in which said valve control means comprises electromagnetic motor means for linearly and reciprocably moving said spool valve means by an amount corresponding to the value of the electrical output signal from said output means.

10. The invention according to claim 7 in which said electrical feedback means comprises a linearly reciprocable magnetic core member coupled to said linearly movable rod for simultaneous movement therewith, and an electromagnetic field around said linearly movable core member for producing said electrical feedback signal proportional to the linear position of said core member.

11. The invention according to claim 1 further comprising starter means for said hydraulic fluid supply means, electrical interlock means communicating with said starter means and comprising needle sensor means for producing an electricl starter signal only when said needle bar is in its uppermost position to actuate said starter means.

12. The invention according to claim 11 in which the means for reciprocating said needle bar comprises a rotary needle shaft, said needle sensor means comprising a flywheel on said needle shaft having a magnetic detector element on the periphery thereof, and a magnetic sensing head spaced in a predetermined position adjacent the periphery of said flywheel for generating said electrical starter signal when said detector element is sensed by said magnetic sensing head.

13. The invention according to claim 1 in which said coupling means connects said actuator to said needle bar, said electrical valve control means being adapted to move said actuator in increments equal to the needle gauge of said needles, or multiples thereof, upon energization by said programmed output signals.

14. The invention according to claim 13 further comprising a hook for each needle mounted below said backing material support for cooperation with each corresponding needle upon the downstroke of said needle bar, and means for reciprocably moving said hooks for engaging yarns carried by said needles for forming pile loops in said backing material.

* * * * *